US008406665B2

(12) United States Patent
Hirose et al.

(10) Patent No.: US 8,406,665 B2
(45) Date of Patent: Mar. 26, 2013

(54) BELT DRIVING DEVICE AND IMAGE FORMING APPARATUS USING THE SAME

(75) Inventors: Yuichi Hirose, Kanagawa (JP); Hiroaki Takagi, Kanagawa (JP); Takuro Kamiya, Kanagawa (JP); Junya Takigawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 331 days.

(21) Appl. No.: 12/923,999

(22) Filed: Oct. 20, 2010

(65) Prior Publication Data

US 2011/0110691 A1 May 12, 2011

(30) Foreign Application Priority Data

Nov. 6, 2009 (JP) ................................ 2009-255148

(51) Int. Cl.

*G03G 15/01* (2006.01)
*G03G 15/00* (2006.01)
*G03G 15/16* (2006.01)
*G03G 15/08* (2006.01)
*B65G 23/04* (2006.01)

(52) U.S. Cl. ............ 399/302; 399/36; 399/66; 399/121; 198/835

(58) Field of Classification Search .................... 399/36, 399/66, 121, 302; 198/835
See application file for complete search history.

(56) References Cited

U.S. PATENT DOCUMENTS

| | | | |
|---|---|---|---|
| 5,697,031 | A | 12/1997 | Kamiya et al. |
| 6,816,178 | B2 | 11/2004 | Yamada et al. |
| 6,898,386 | B2 | 5/2005 | Takigawa |
| 6,947,693 | B2 | 9/2005 | Kamiya et al. |
| 6,993,276 | B2 | 1/2006 | Kamiya |
| 7,224,921 | B2 | 5/2007 | Iijima et al. |
| 7,245,863 | B2 | 7/2007 | Kamiya |
| 7,340,198 | B2 | 3/2008 | Takigawa |
| 7,356,277 | B2 | 4/2008 | Iijima et al. |
| 7,379,683 | B2 | 5/2008 | Kamiya et al. |
| 7,400,842 | B2 | 7/2008 | Takehara et al. |
| 7,491,142 | B2 | 2/2009 | Takuroh et al. |
| 7,526,233 | B2 | 4/2009 | Kamiya |
| 7,532,370 | B2 | 5/2009 | Kudo et al. |
| 7,548,713 | B2 | 6/2009 | Takigawa et al. |
| 7,561,826 | B2 | 7/2009 | Takigawa |
| 7,616,922 | B2 | 11/2009 | Yoshino et al. |

(Continued)

FOREIGN PATENT DOCUMENTS

| | | |
|---|---|---|
| JP | 09-048533 | 2/1997 |
| JP | 3082452 | 6/2000 |

(Continued)

OTHER PUBLICATIONS

Abstract of JP 06-056294 published on Mar. 1, 1994.

*Primary Examiner* — Joseph S Wong
(74) *Attorney, Agent, or Firm* — Harness, Dickey & Pierce, P.L.C.

(57) ABSTRACT

A steering controller uses a photointerrupter that detects the position of a filler when a steering roller is in a predetermined reference inclined position. The steering controller drives a steering motor to bring the steering roller to the reference inclined position based on a detection result obtained by the photointerrupter every time predetermined adjustment timing arrives or every time the power is turned on. Using the rotation angle of the steering motor in this condition as a reference rotation angle, the steering controller controls the rotation of the steering motor.

14 Claims, 9 Drawing Sheets

U.S. PATENT DOCUMENTS

| | | | |
|---|---|---|---|
| 7,684,742 | B2 | 3/2010 | Kamiya |
| 2005/0214035 | A1 | 9/2005 | Kamiya |
| 2006/0002748 | A1 | 1/2006 | Kudo et al. |
| 2007/0196129 | A1 | 8/2007 | Takigawa et al. |
| 2008/0047157 | A1 | 2/2008 | Takayama et al. |
| 2008/0310891 | A1 * | 12/2008 | Mochizuki .................... 399/302 |
| 2009/0028597 | A1 | 1/2009 | Takigawa et al. |
| 2009/0042656 | A1 | 2/2009 | Takigawa et al. |
| 2009/0054164 | A1 | 2/2009 | Takigawa et al. |
| 2009/0060605 | A1 | 3/2009 | Ohkushi et al. |
| 2009/0120763 | A1 | 5/2009 | Takuroh et al. |
| 2009/0196655 | A1 | 8/2009 | Takigawa et al. |
| 2009/0317108 | A1 * | 12/2009 | Taki et al. ....................... 399/66 |
| 2009/0324262 | A1 | 12/2009 | Matsuda et al. |
| 2010/0017019 | A1 | 1/2010 | Andoh et al. |
| 2010/0239282 | A1 | 9/2010 | Ashikawa et al. |

FOREIGN PATENT DOCUMENTS

| | | |
|---|---|---|
| JP | 2007-003647 | 1/2007 |
| JP | 2009-053606 | 3/2009 |

* cited by examiner

BELT DRIVING DEVICE AND IMAGE FORMING APPARATUS USING THE SAME

CROSS-REFERENCE TO RELATED APPLICATIONS

The present application claims priority to and incorporates by reference the entire contents of Japanese Patent Application No. 2009-255148 filed in Japan on Nov. 6, 2009.

BACKGROUND OF THE INVENTION

1. Field of the Invention

The present invention relates to a belt driving device and an image forming apparatus provided with the belt driving device.

2. Description of the Related Art

Some conventional image forming apparatuses, such as copiers or printers, form an image by using an endless belt, such as an intermediate transfer belt, a photosensitive belt, or a paper conveying belt. Generally, when an endless belt is run as being stretched over a certain number of rollers including a driving roller, so-called belt meandering, in which a running endless belt is displaced in the direction perpendicular to the direction in which the endless belt is run (hereinafter, "belt-width direction"), may occur. Such belt meandering may cause a distortion in an image, for example, when an image is formed on the outer circumferential surface of the endless belt or on a recording medium carried on the outer circumferential surface of the endless belt. Furthermore, when a color image is to be formed by sequentially forming images of different colors one on top of another, the position of the image of each color may be displaced with respect to the others along the belt-width direction, resulting in color shifts or color unevenness. Because a user can easily detect the color shifts or the color unevenness, it is required to reduce the belt meandering appropriately when a color image is to be formed in the manner describe above.

According to a commonly known technology for reducing the endless belt meandering, an inclination of one or more supporting rollers (hereinafter, "steering roller(s)") supporting the endless belt is controlled to reduce the belt meandering (hereinafter, "steering method"). In the steering method, a smaller external force is applied to the endless belt compared to a method for reducing the belt meandering by hooking a rib, a guide, or the like arranged on an edge in a belt-width direction of the inner circumferential surface of the endless belt onto an end surface of the supporting roller. Therefore, the steering method is more reliable in running stability and durability of the endless belt.

Japanese Patent Application Laid-open No. H9-48533 and Japanese Patent Application Laid-open No. 2007-3647 disclose conventional belt driving devices using the steering method.

The belt driving device disclosed in Japanese Patent Application Laid-open No. H9-48533 includes an endless driving wire fixed to one end (driving end) of a pre-primary transfer roller (steering roller). The driving wire is moved in a wire-length direction to displace the end (driving end) of the pre-primary transfer roller with respect to the other end to control the inclination of the pre-primary transfer roller. A rotational driving force of a stepper motor is communicated to a driving pulley, among a plurality of pulleys over which the driving wire extend. Because the driving wire is moved by an amount corresponding to the rotation angle of the stepper motor, the amount of the inclination of the pre-primary transfer roller can be controlled by controlling the rotation angle of the stepper motor.

The belt driving device disclosed in Japanese Patent Application Laid-open No. 2007-3647 has a structure including a meandering correcting roller (steering roller) having one end (driving end) attached to one end of a swinging arm, and the other end of the swinging arm is kept in contact with an eccentric cam. The swinging arm is biased by a spring so that the other end of the swinging arm is kept in contact with the cam surface of the eccentric cam. The other end of the swinging arm is displaced as the cam surface is displaced by an amount corresponding to the rotation angle of the eccentric cam. In this manner, the end (driving end) of the meandering correcting roller attached to the end of the swinging arm is displaced relatively to the other end to control the inclination of the meandering correcting roller. Because the rotation angle of the eccentric cam is determined by the rotation angle of a meandering correction motor, the amount of the inclination of the meandering correcting roller can be controlled by controlling the rotation angle of the meandering correction motor.

In the conventional belt driving devices using the steering method, structural members, such as the wire and the eccentric cam, included in an inclining mechanism performing an operation of inclining the steering roller by using a driving force of a driving source may change in the condition, e.g., become worn out, stretched, or contracted, or material thereof may change over a long time of usage. As a result, inclination cannot be controlled properly.

As a specific example, in a wire-based structure in which a wire is used in inclining the steering roller, such as the one employed in the belt driving device described in Japanese Patent Application Laid-open No. H9-48533, the wire has to be tensioned with a tensile force larger than a certain level. Therefore, if the wire is used over a long time, the wire becomes stretched or loose. Furthermore, the wire may also become stretched if an external force of an unexpected strength is applied to the wire. If the wire becomes stretched, the tensile force of the wire is reduced, and the driving force cannot be communicated appropriately from the driving pulley to the wire. Therefore, the operation of the inclining mechanism cannot be controlled appropriately. As a result, the inclination of the steering roller cannot be controlled properly.

If a tensioning mechanism is provided to maintain the tensile force of the wire even when the wire is stretched, the driving force can be communicated appropriately from the driving pulley to the wire even when the wire is stretched. However, in this case, the position of the driving end of the steering roller varies depending on the amount by which the wire is stretched. In other words, even if the operation of the inclining mechanism is controlled to bring the driving end of the steering roller to the same position, the inclination amount of the steering roller differs between before and after the wire is stretched. In this case also, the operation of the inclining mechanism cannot be controlled appropriately, thus the inclination of the steering roller cannot be controlled properly.

In a cam-based structure in which the eccentric cam is used in inclining the steering roller, such as the one employed in the belt driving device described in the Japanese Patent Application Laid-open No. 2007-3647, upon controlling the inclination of the steering roller, the cam surface of the eccentric cam has to slide over a member that moves together with the driving end of the steering roller. Therefore, the cam surface of the eccentric cam or the member kept in contact with the cam surface is worn out and deformed after a long time of usage. Such a deformation also changes the position of the driving end of the steering roller. In other words, even if the operation of the inclining mechanism is controlled to keep the driving end of the steering roller in the same position, the inclination amount of the steering roller becomes different between before and after the deformation. In this case also, the operation of the inclining mechanism cannot be controlled appropriately, and therefore the inclination of the steering roller cannot be controlled properly.

Such a problem may occur in a structure in which the structural member of the inclining mechanism, which performs the operation of inclining the steering roller by using the driving force of the driving source, changes in the condition for some reason, which causes a control error, such as a difference in the actual amount of the inclination of the steering roller between before and after the condition change.

SUMMARY OF THE INVENTION

It is an object of the present invention to at least partially solve the problems in the conventional technology.

According to an aspect of the present invention, a belt driving device includes an endless belt, an inclining mechanism, a belt-width direction displacement detecting unit, an inclination controlling unit, a displacing member, and a position detecting unit. The endless belt is stretched over and supported by a plurality of supporting rollers including a steering roller for correcting belt meandering. The inclining mechanism performs an operation of inclining the steering roller by a driving force from a driving source. The belt-width direction displacement detecting unit detects the displacement of the endless belt in a belt-width direction. The inclination controlling unit determines the inclination amount of the steering roller based on a detection result obtained by the belt-width direction displacement detecting unit, and controls the operation of the inclining mechanism to incline the steering roller by the inclination amount such that meandering of the endless belt is corrected by changing the inclination amount of the steering roller. The displacing member is displaced integrally with the steering roller according to the inclination amount of the steering roller. The position detecting unit detects the position of the displacing member when the steering roller is in a predetermined reference inclined position. The inclination controlling unit causes the inclining mechanism to perform the operation of inclining the steering roller to the reference inclined position based on a detection result obtained by the position detecting unit every time predetermined adjustment timing arrives and, using an amount of the operation performed by the inclining mechanism at this time as an operation reference, controls the operation of the inclining mechanism based on the operation reference.

According to another aspect of the present invention, an image forming apparatus forms an image on a recording medium by transferring an image formed on a circumferential surface of an endless belt stretched over and supported by a plurality of supporting rollers onto the recording medium or forms an image on a recording medium carried on the circumferential surface of the endless belt. The image forming apparatus comprises a belt driving device as a belt driving unit that drives the endless belt. The belt driving device includes an endless belt, an inclining mechanism, a belt-width direction displacement detecting unit, an inclination controlling unit, a displacing member, and a position detecting unit. The endless belt is stretched over and supported by a plurality of supporting rollers including a steering roller for correcting belt meandering. The inclining mechanism performs an operation of inclining the steering roller by a driving force from a driving source. The belt-width direction displacement detecting unit detects the displacement of the endless belt in a belt-width direction. The inclination controlling unit determines the inclination amount of the steering roller based on a detection result obtained by the belt-width direction displacement detecting unit, and controls the operation of the inclining mechanism to incline the steering roller by the inclination amount such that meandering of the endless belt is corrected by changing the inclination amount of the steering roller. The displacing member is displaced integrally with the steering roller according to the inclination amount of the steering roller. The position detecting unit detects the position of the displacing member when the steering roller is in a predetermined reference inclined position. The inclination controlling unit causes the inclining mechanism to perform the operation of inclining the steering roller to the reference inclined position based on a detection result obtained by the position detecting unit every time predetermined adjustment timing arrives and, using an amount of the operation performed by the inclining mechanism at this time as an operation reference, controls the operation of the inclining mechanism based on the operation reference.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings.

To begin with, a basic structure of the printer according to an embodiment will be explained.

Figure 1:
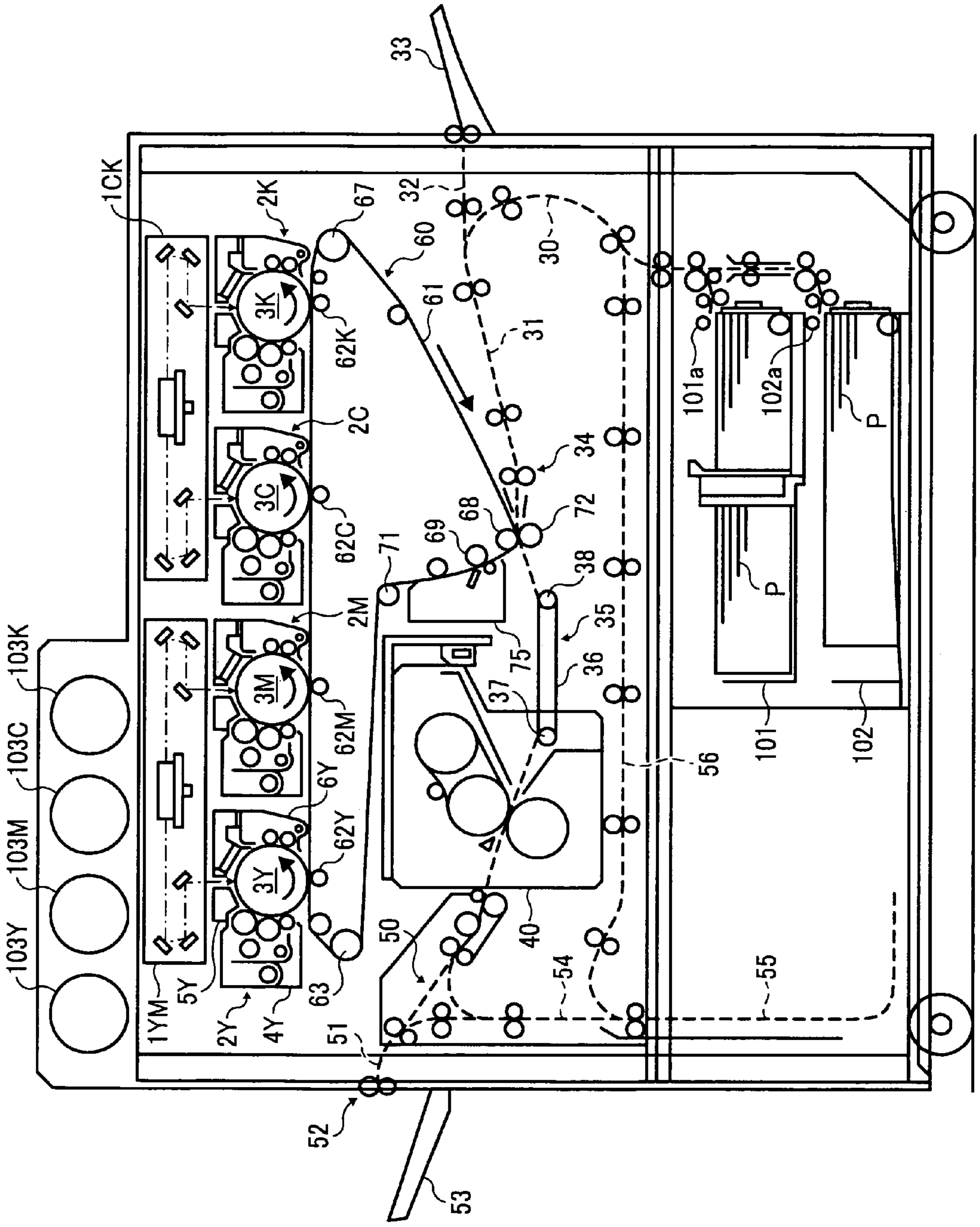
FIG. 1 is a schematic of a structure of an example of a printer according to an embodiment of the present invention.

FIG. 1 is a schematic of a structure of an example of the printer according to the embodiment.

The printer includes two optical writing units 1YM and 1CK, and four processing units 2Y, 2M, 2C, and 2K respectively for forming toner images of yellow (Y), magenta (M), cyan (C), and black (K). The printer also includes a sheet feed path 30, a pre-transfer conveying path 31, a manual sheet feed path 32, a manual feed tray 33, a registration roller pair 34, a conveying belt unit 35, a fixing unit 40, a conveying path switching unit 50, a sheet ejection path 51, a sheet ejection roller pair 52, a sheet ejection tray 53, a first sheet feeder cassette 101, a second sheet feeder cassette 102, and a re-sending unit.

The first sheet feeder cassette 101 and the second sheet feeder cassette 102 each store a bundle of recording sheets P that are recording media. The topmost one of the recording sheets P is sent to the sheet feed path 30 by the driving rotation of sheet feed rollers 101*a* and 102*a*. The sheet feed path 30 continues to the pre-transfer conveying path 31 for conveying the recording sheet at a position immediately before a secondary transfer nip to be described later. The recording sheet P sent out from the sheet feeder cassettes 101 and 102 enters the pre-transfer conveying path 31 via the sheet feed path 30.

On a side of a printer housing, the manual feed tray 33 is arranged in an openable and closable manner with respect to the housing, and a bundle of sheets is manually placed on the top surface of the tray that is opened with respect to the housing. The topmost one of the recording sheets P manually placed is sent to the pre-transfer conveying path 31 by sending rollers included in the manual feed tray 33.

Each of the two optical writing units 1YM and 1CK includes a laser diode, a polygon mirror, and various lenses, and drives the laser diode based on image information read by a scanner arranged external to the printer, or image information received from a personal computer, to optically scan photosensitive elements 3Y, 3M, 3C, and 3K respectively included in the processing unit 2Y, 2M, 2C, and 2K. More specifically, the photosensitive elements 3Y, 3M, 3C, and 3K included in the processing units 2Y, 2M, 2C, and 2K are driven to rotate in the counterclockwise direction in FIG. 1 by a driving unit (not illustrated). The optical writing unit 1YM performs an optical scanning process by irradiating the photosensitive elements 3Y and 3M, being driven, respectively with laser beams, while deflecting the laser beams in a rotation axis direction. By the optical scanning process, electrostatic latent images are formed on the photosensitive elements 3Y and 3M, respectively, based on Y image information and M image information. The optical writing unit 1CK performs an optical scanning process by irradiating the photosensitive elements 3C and 3K, being driven, with laser beams respectively, while deflecting the laser beams in the rotation axis direction. By the optical scanning process, electrostatic latent images are formed on the photosensitive elements 3C and 3K, respectively, based on C image information and K image information.

The processing units 2Y, 2M, 2C, and 2K include drum-shaped photosensitive elements 3Y, 3M, 3C, and 3K that are image carrying bodies, respectively. In each of the processing units 2Y, 2M, 2C, and 2K, various devices arranged around each of the photosensitive elements 3Y, 3M, 3C, and 3K are supported on a common supporting body as single unit, and such a unit can be mounted onto or removed from the printer main body. Each of the processing units 2Y, 2M, 2C, and 2K has the same structure except for the color of toner used thereby. To use the processing unit 2Y for the color Y as an example, the processing unit 2Y includes the photosensitive element 3Y, as well as a developing unit 4Y for developing the electrostatic latent image formed on the photosensitive element 3Y. The processing unit 2Y also includes a charging unit 5Y that uniformly charges the surface of the photosensitive element 3Y that is driven in rotation, and a drum cleaning unit 6Y that cleans the toner remaining after transfer and attached on the surface of the photosensitive element 3Y that has passed through a first transfer nip for the color Y that is to be described later.

The printer illustrated in FIG. 1 has a so-called tandem structure in which the four processing units 2Y, 2M, 2C, and 2K are arranged along the direction of the endless movement of an intermediate transfer belt 61 to be described later.

In this example, a drum-shaped element including a base pipe made of a material such as aluminum formed with a photosensitive layer by applying an organic photosensitive material is used as the photosensitive element 3Y. However, an endless belt shaped element may also be used.

The developing unit 4Y develops a latent image using a two-component developer (hereinafter, simply referred to as "developer") containing magnetic carrier and non-magnetic Y toner (not illustrated). As the developing unit 4Y, another type of a developing unit that uses a single-component developer not containing the magnetic carrier in development, instead of the two-component developer, may be used. A Y toner supplying unit (not illustrated) supplies Y toner from a Y-toner bottle 103Y into the developing unit 4Y. Similarly, toners of other colors (M, C, and K) are supplied from toner bottles 103M, 103C, and 103K.

As the drum cleaning unit 6Y, a cleaning unit that presses a cleaning blade made of polyurethane rubber, which is a cleaning member, against the photosensitive element 3Y is used. However, other types of cleaning units may also be used. In this printer, a structure in which a rotatable fur brush is pressed against the photosensitive element 3Y is adapted to improve the cleaning performance. The fur brush also functions to scrub off lubricant from a solid lubricant (not illustrated) into fine powder, to apply the lubricant onto the surface of the photosensitive element 3Y.

A neutralizing lamp (not illustrated) is arranged above the photosensitive element 3Y, and the neutralizing lamp is included as a part of the processing unit 2Y as well. The neutralizing lamp neutralizes the surface of the photosensitive element 3Y that has passed through the drum cleaning unit 6Y by irradiating the surface with a light beam. The neutralized surface of the photosensitive element 3Y is charged uniformly by the charging unit 5Y, and is optically scanned by the optical writing unit 1YM. The charging unit 5Y is driven in rotation by a charging bias supplied from a power source (not illustrated). Alternatively, the surface of the photosensitive element 3Y may be charged by a scorotron-charging technique in which the photosensitive element 3Y is charged in a non-contacting manner.

The processing unit 2Y for the color Y is explained above, but each of the processing units 2M, 2C, and 2K for the colors M, C, and K has the same structure as the processing unit 2Y for the color Y.

A transfer unit 60 is arranged under the four processing units 2Y, 2M, 2C, and 2K. The transfer unit 60 keeps an intermediate transfer belt 61 that is an endless belt stretched over a plurality of supporting rollers in contact with the photosensitive elements 3Y, 3M, 3C, and 3K, and causes the intermediate transfer belt 61 to run (move endlessly) in the clockwise direction in FIG. 1 by the driving rotation of one of the supporting rollers. With such an arrangement, primary transfer nips, at which the photosensitive elements 3Y, 3M, 3C, and 3K and the intermediate transfer belt 61 are kept in contact, is formed for the colors Y, M, C, and K.

Near the primary transfer nips for the colors Y, M, C, and K, the intermediate transfer belt 61 is pressed against the photosensitive elements 3Y, 3M, 3C, and 3K by primary transfer rollers 62Y, 62M, 62C, and 62K that are primary transfer members arranged in an area surrounded by an inner circumferential surface of the intermediate transfer belt that is a belt loop. A power source (not illustrated) applies a primary transfer bias to the primary transfer rollers 62Y, 62M, 62C, and 62K. In this manner, primary transfer electrical fields for electrostatically moving the toner images on the photosensitive elements 3Y, 3M, 3C, and 3K to the intermediate transfer belt 61 is formed at the primary transfer nips for the colors Y, M, C, and K.

The toner images are primarily transferred, in the manner overlapping each other, onto the outer circumferential surface of the intermediate transfer belt 61 sequentially passing through the primary transfer nips for the colors Y, M, C, and K, while the intermediate transfer belt 61 is moved endlessly in the clockwise direction in FIG. 1. By the overlapping primary transfer, a four-colored overlapping toner image (hereinafter, "four-colored toner image") is formed on the outer circumferential surface of the intermediate transfer belt 61.

A secondary transfer roller 72 that is a secondary transfer member is arranged under the intermediate transfer belt 61 in FIG. 1. The secondary transfer roller 72 is brought in contact with a part of the outer circumferential surface of the intermediate transfer belt 61 wound around a secondary transfer backup roller 68 to form a secondary transfer nip. By such an arrangement, the secondary transfer nip, at which the outer circumferential surface of the intermediate transfer belt 61 is kept in contact with the secondary transfer roller 72, is formed.

A power source (not illustrated) applies a secondary transfer bias to the secondary transfer roller 72. On the contrary, the secondary transfer backup roller 68 in the belt loop is grounded. In this manner, a secondary transfer electrical field is formed in the secondary transfer nip.

The registration roller pair 34 is arranged at the right hand side of the secondary transfer nip in FIG. 1, and sends the recording sheet P nipped therebetween into the secondary transfer nip at the timing synchronized with the four-colored toner image on the intermediate transfer belt 61. In the secondary transfer nip, the four-colored toner image on the intermediate transfer belt 61 is secondarily transferred onto the recording sheet P altogether, by effects of the secondary transfer electrical field and a nipping pressure, and a full color image is formed together with the white color of the recording sheet P.

The transfer-remaining toner that is not transferred onto the recording sheet P in the secondary transfer nip is still attached on the outer circumferential surface of the intermediate transfer belt 61 having passed through the secondary transfer nip. The transfer-remaining toner is cleaned by a belt cleaning unit 75 that is kept in contact with the intermediate transfer belt 61.

The recording sheet P that has passed through the secondary transfer nip is separated from the intermediate transfer belt 61, and passed onto the conveying belt unit 35. In the conveying belt unit 35, a conveying belt 36 that is an endless belt is tensioned across a driving roller 37 and a driven roller 38, to move the conveying belt 36 in the counterclockwise direction in FIG. 1 by the driving rotation of the driving roller 37. The conveying belt unit 35 holds the recording sheet P fed from the secondary transfer nip on the tensioned outer circumferential surface of the conveying belt 36, to convey and to feed the recording sheet P into a fixing unit 40 that is a fixing means along with the endless movement of the conveying belt 36.

The printer includes the re-sending units having the conveying path switching unit 50, a re-sending path 54, a switching back path 55, and a post-switch back path 56. More specifically, the conveying path switching unit 50 switches the path for conveying the recording sheet P received from the fixing unit 40 between the sheet ejection path 51 and the re-sending path 54. Upon executing a simplex-mode print job causing an image to be printed only on a first side of the recording sheet P, the conveying path switching unit 50 sets the path to convey the recording sheet P to the sheet ejection path 51. In this manner, the recording sheet P having an image printed only on the first side is sent into the sheet ejection roller pair 52 via the sheet ejection path 51, and ejected onto the sheet ejection tray 53 that is external to the machine. Upon executing a duplex-mode print job causing images to be printed on both sides of the recording sheet P, the conveying path switching unit 50 sets the path for conveying the sheet P to the sheet ejection path 51 when the recording sheet P having both sides printed with images is received from the fixing unit 40. In this manner, the recording sheet P having images printed on both sides is ejected onto the sheet ejection tray 53 being external to the machine. On the contrary, while executing a duplex-mode print job, if the conveying path switching unit 50 receives the recording sheet P having an image fixed only on the first side from the fixing unit 40, the conveying path switching unit 50 sets the path for conveying the sheet P to the re-sending path 54.

The re-sending path 54 is connected to the switching back path 55, and the recording sheet P that is sent into the re-sending path 54 is introduced into the switching back path 55. When the entire area of the recording sheet P enters the switching back path 55 completely in the conveying direction, the conveying direction of the recording sheet P is reversed, and the direction of the recording sheet P is switched back. The switching back path 55 is not only connected to the re-sending path 54 but also to the post-switch back path 56. The switched-back recording sheet P is then introduced to the post-switch back path 56. At this time, the top and the bottom surfaces of the recording sheet P are reversed. The reversed recording sheet P is sent into the secondary transfer nip again via the post-switch back path 56 and the sheet feed path 30. The recording sheet P having a toner image transferred onto a second side in the secondary transfer nip goes through the fixing unit 40 to have the toner image fixed onto the second side, and ejected onto the sheet ejection tray 53 via the conveying path switching unit 50, the sheet ejection path 51, and the sheet ejection roller pair 52.

A belt driving device for driving the intermediate transfer belt 61 that is a characteristic part of the present invention will now be explained.

Figure 2:
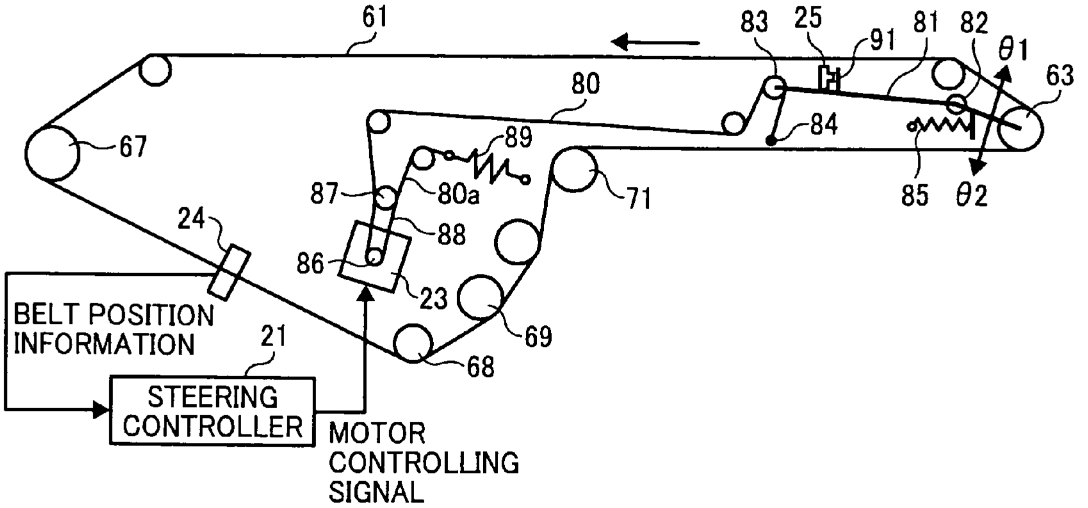
FIG. 2 is a schematic for explaining a general structure of a belt driving device for driving an intermediate transfer belt of the printer according to the embodiment.

FIG. 2 is a schematic for explaining a general structure of the belt driving device according to the embodiment.

The belt driving device according to the embodiment mainly includes the intermediate transfer belt 61, an inclining mechanism, an edge sensor 24, and a steering controller 21. The intermediate transfer belt 61 is an endless belt stretched over and supported by a plurality of supporting rollers 63, 67, 68, 69, and 71 including the steering roller 63 for correcting belt meandering. The inclining mechanism performs the operation of inclining the steering roller 63 by a driving force from a steering motor 23 as a driving source. The edge sensor 24 detects the displacement of the intermediate transfer belt 61 in the belt-width direction as a belt-width direction displacement detecting unit. The steering controller 21 determines an inclination amount by which the steering roller 63 is to be inclined based on a detection result obtained by the edge sensor 24, and controls the operation of the inclining mechanism by controlling the steering motor 23 so that the steering roller 63 is inclined by the determined inclination amount. To correct the meandering of the intermediate transfer belt 61, the inclination amount of the steering roller 63 is changed. In this embodiment, the supporting roller 67 is used as the driving roller, but any other supporting roller may be used as the driving roller.

Figure 3:
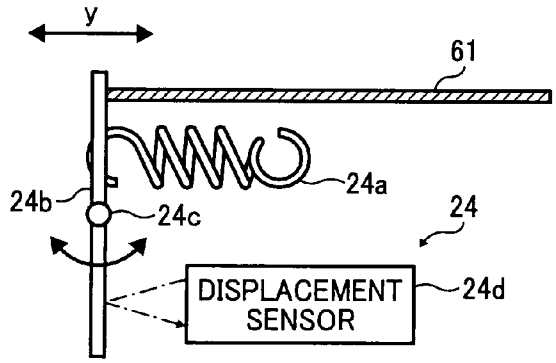
FIG. 3 is a schematic of an example of a specific structure of an edge sensor included in the belt driving device.

FIG. 3 is a schematic of an example of a specific structure of the edge sensor 24.

As illustrated in FIG. 3, a contactor 24*b* being rotatably supported on a supporting shaft 24*c* is kept at a part of an edge of the intermediate transfer belt 61. The contactor 24*b* is configured to be kept in contact with the part of the edge of the intermediate transfer belt 61 by a biasing force of a spring 24*a* (pulling force). The contacting pressure of the contactor 24*b* applied by the spring 24*a* is set at an appropriate level so as not to deform the edge of the intermediate transfer belt 61. A displacement sensor 24*d* is arranged facing to the other end of the contactor 24*b* with respect to the supporting shaft 24*c*. The edge sensor 24 having such a structure converts a movement of the intermediate transfer belt 61 in a width direction y during the belt meandering into a movement of the contactor 24*b* that is in contact with the edge of the intermediate transfer belt 61 (a rotation of the contactor 24*b* about the supporting shaft 24*c*). Because an output level of the displacement sensor 24*d* changes accordingly to the movement of the contactor 24*b*, an output of the edge sensor 24 indicates the amount of the displacement of the intermediate transfer belt 61 in the belt-width direction. In this embodiment, the edge sensor 24 is positioned between the driving roller 67 and the secondary transfer backup roller 68 in the running direction of the intermediate transfer belt 61, as illustrated in FIG. 2.

Figure 4:
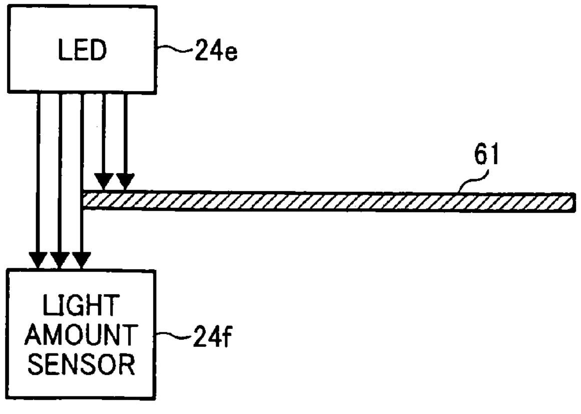
FIG. 4 is a schematic of another example of the structure of the edge sensor.

The edge sensor 24 may also have another structure as long as such a structure generates an output correspondingly to the displacement of the intermediate transfer belt 61 in the belt-width direction (meandering). For example, as illustrated in FIG. 4, a light emitting diode (LED) 24*e* and a light amount sensor 24*f* may be arranged facing to each other across the part of the edge of the intermediate transfer belt 61. In such a structure, the blocked amount of light that is output from the LED 24*e* changes according to the displacement of the intermediate transfer belt 61 in the belt-width direction, and the amount of light incoming to the light amount sensor 24*f* also changes. Therefore, the level of an output from the light amount sensor 24*f* corresponds to the amount of the displacement of the intermediate transfer belt 61 in the belt-width direction.

Figure 5:
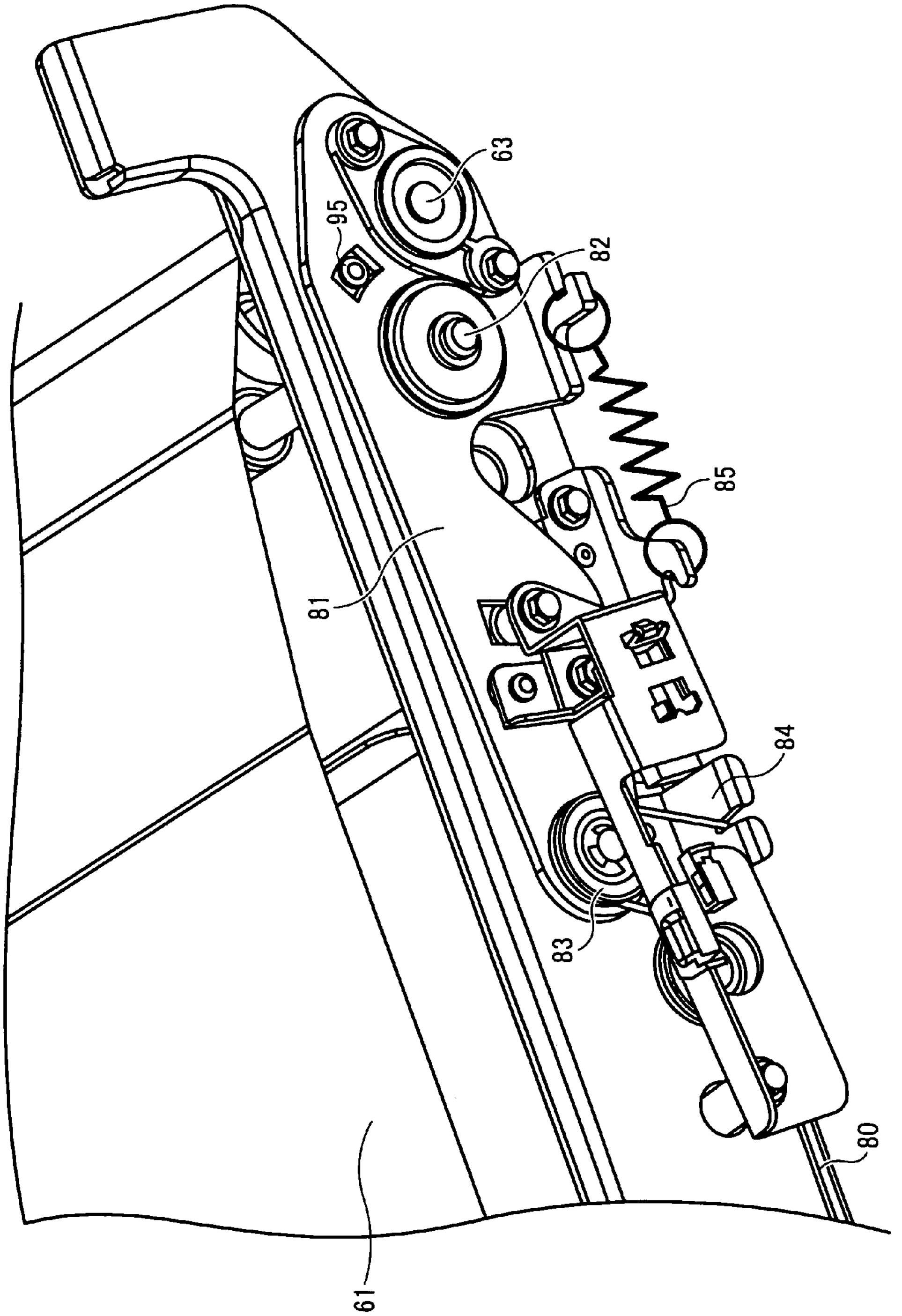
FIG. 5 is a perspective view of part of an inclining mechanism arranged on one end (driving end) of a steering roller, included in the belt driving device, viewed diagonally from the top.

FIG. 5 is a perspective view of a part of the inclining mechanism arranged on one end (driving end) of the steering roller 63 viewed diagonally from the top.

Figure 6:
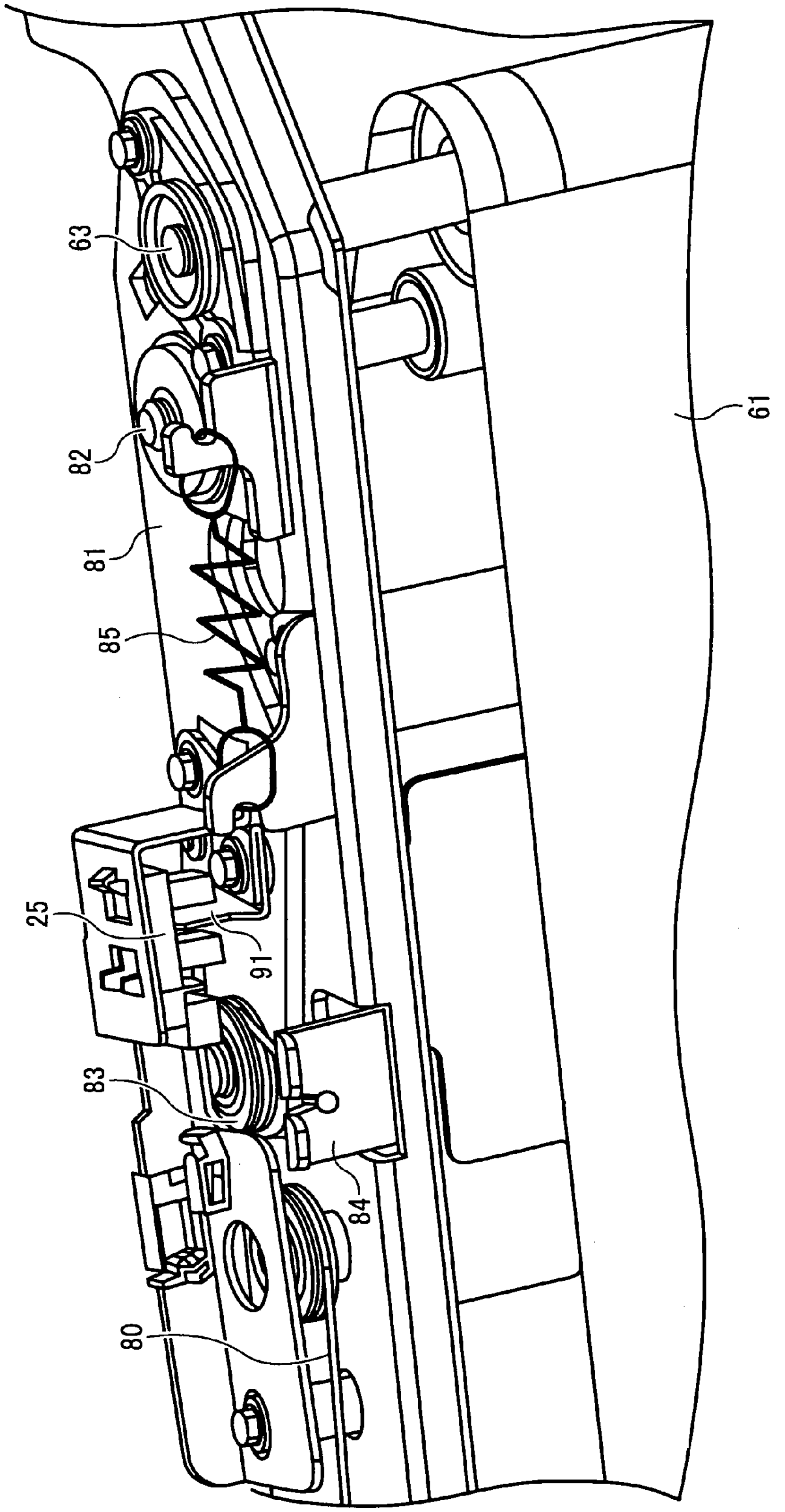
FIG. 6 is a perspective view of the part of the inclining mechanism viewed diagonally from the bottom.

FIG. 6 is a perspective view of the part of the inclining mechanism viewed diagonally from the bottom.

In this embodiment, a one-side held wire structure is used for the inclining mechanism performing an operation of inclining the steering roller 63, as illustrated in FIG. 2. The inclining mechanism will now be explained specifically.

Figure 7:
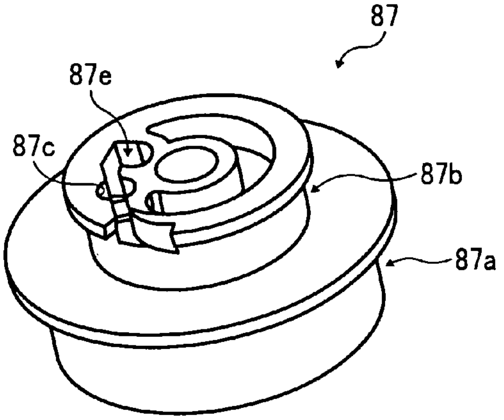
FIG. 7 is a perspective view of a winding pulley included in the inclining mechanism.

A driving pulley 86 is arranged on an output shaft of the steering motor 23. The driving pulley 86 tensions a timing belt 88 together with a winding pulley 87. As illustrated in FIG. 7, the winding pulley 87 has a belt pulley portion 87*a* around which the timing belt 88 is wound and a wire pulley portion 87*b* to which one end of a wire 80 (hereinafter, "driving end") is fixed, and the belt pulley portion 87*a* and the wire pulley portion 87*b* are formed integrally along the same axis. When the steering motor 23 is rotated to drive the driving pulley 86 in rotation, the winding pulley 87 is rotated via the timing belt 88, and the driving end of the wire 80 is wound around the wire pulley portion 87*b*. Because the winding pulley 87 according to the embodiment has the wire pulley portion 87*b* formed to have a smaller diameter than the belt pulley portion 87*a*, the winding pulley 87 functions as a decelerating unit.

Figure 8:
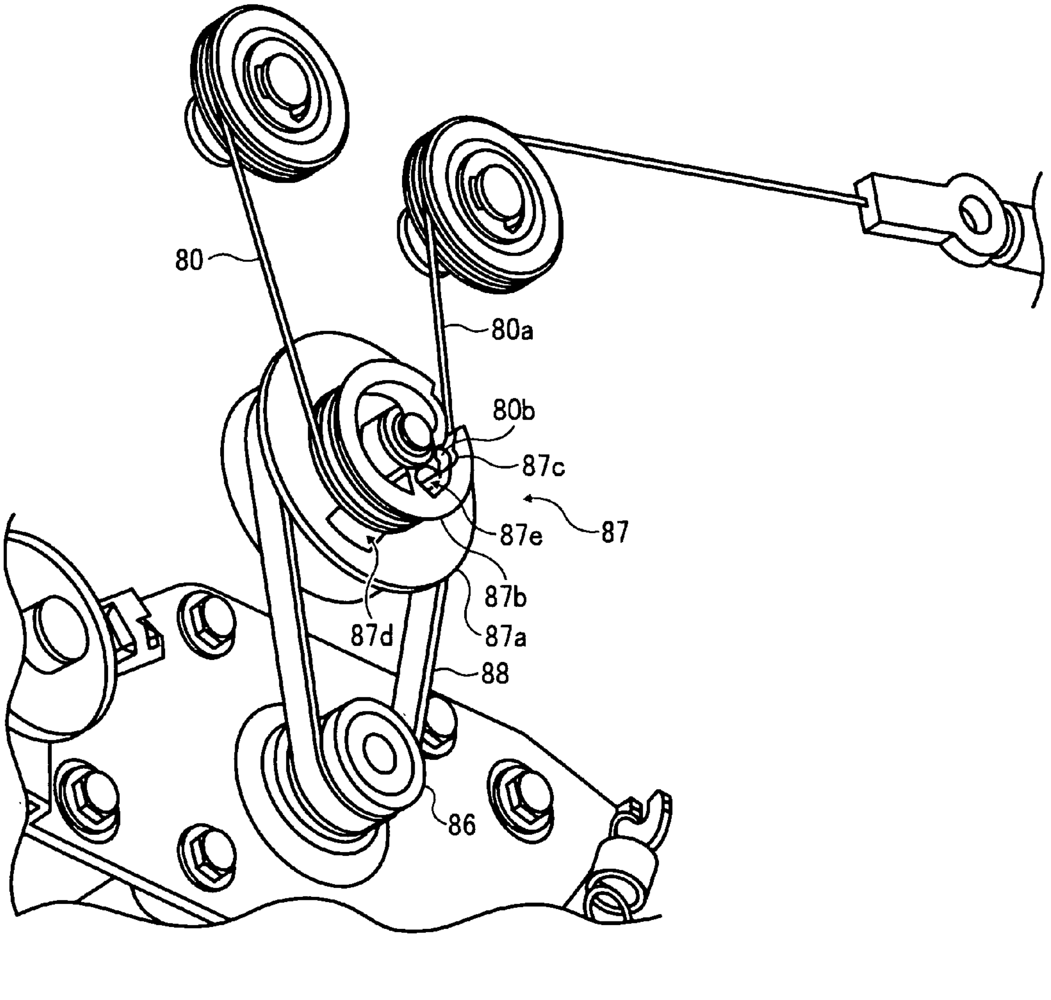
FIG. 8 is an enlarged view of proximities of the winding pulley.

FIG. 8 is an enlarged view of proximities of the winding pulley 87.

In this embodiment, a fixing ball 80*b* is fixed to the wire 80 near the driving end, and the fixing ball 80*b* is engaged with a fixing hole 87*c* formed on the winding pulley 87, to fix the driving end of the wire 80 to the wire pulley portion 87*b* of the winding pulley 87. More specifically, an opening 87*d* is formed on the wire pulley portion 87*b* to accept the end of the wire 80, and a wire portion accepted inside the winding pulley 87 through the opening 87*d* can exit to the outside of the winding pulley 87 through an opening 87*e* formed on the side of the winding pulley 87 where the fixing hole 87*c* is formed. The driving end of the wire 80 is wound around the wire pulley portion 87*b* by an appropriate number of times, let go inside of the winding pulley 87 through the opening 87*d*, and pulled out of the opening 87*e* arranged on the end surface of the winding pulley 87, and the fixing ball 80*b* is engaged into the fixing hole 87*c* to fix the wire 80 to the winding pulley 87.

On the contrary, the other end of the wire 80 is wound around a moving pulley 83, and fixed to the wire holder 84. The moving pulley 83 is rotatably supported on one end of a long roller holder 81. On the end of the roller holder 81 opposing to the end on which the moving pulley 83 is supported, the driving end of the steering roller 63 is supported rotatably. A midpoint of the roller holder 81 in the longitudinal direction is rotatably supported around a supporting shaft 82. The roller holder 81 is biased to the clockwise direction in FIG. 2 around the supporting shaft 82 by a pulling spring 85. The pulling spring 85 applies a biasing force to displace the moving pulley 83 around which the wire 80 is wound toward the top of FIG. 2, which is the direction in which the tensile force acts on the wire 80. Therefore, the pulling spring 85 functions as a tensile force applying unit for constantly and stably applying an appropriate tensile force to the wire 80.

In this embodiment, at the driving end of the wire 80, a wire portion 80*a* located nearer to the end of the wire 80 than the fixing ball 80*b* is pulled by a pulling spring 89. The wire portion 80*a* and the pulling spring 89 are arranged to reduce a driving torque of the steering motor 23. In other words, when the steering motor 23 is driven to be rotated in a direction against the biasing force of the pulling spring 85, a driving load corresponding to the biasing force of the pulling spring 85 is added to the steering motor 23. Because the biasing force of the pulling spring 89 is added in the direction of the driving rotation, the driving load is reduced. In the explanation of the embodiment, a part of the wire 80 is used as a unit for reducing the driving torque of the steering motor 23 as an example. However, the same effect can be achieved by fixing a member, such as a wire, separate from the wire 80 to the winding pulley 87, and by pulling such a member in the direction for rotating the winding pulley 87 so that the wire 80 is wound therearound.

In the inclining mechanism having such a structure, the steering motor 23 is driven to be rotated to wind or to release the wire 80 around or from the winding pulley 87 to cause the moving pulley 83 to be displaced, and to cause the roller holder 81 to rotate about the supporting shaft 82. As a result, the driving end of the steering roller 63 is displaced relatively to the other end, causing the steering roller 63 to incline. If the wire-based structure in which the wire 80 is wound around the winding pulley 87 in the manner explained in this embodiment is adopted, because the amount by which the wire 80 is allowed to move is increased, the range in which the steering roller 63 is allowed to incline can be increased, that is, the range of controllable inclination amount can be increased. If the range of by which the steering roller 63 is inclined is too wide so that the roller holder 81 interferes with components located nearby, a restricting unit may be provided to restrict the rotation of the roller holder 81 to a predetermined range. In this embodiment, a stopper 95 is arranged as the restricting unit, as illustrated in FIG. 5.

Furthermore, because the amount by which the wire 80 is allowed to move is increased, a sufficient range of inclination of the steering roller 63 can be ensured even if the decelerating unit is included. Therefore, the inclining mechanism according to the embodiment can have a structure in which the inclination amount of the steering roller 63 is controlled highly precisely by providing the decelerating unit. In other words, the structure according to the embodiment decelerates the driving rotation of the steering motor 23 to be communicated to the roller holder 81, by leveraging the diameter ratio of the belt pulley portion 87*a* and the wire pulley portion 87*b* included in the winding pulley 87, by employing the moving pulley 83, and by leveraging the ratio of the lengths of the supporting shaft 82 and the respective ends of the roller holder 81 (the principle of leverage), to increase the inclination resolution of the steering roller 63, and to achieve a highly precise inclining control.

Furthermore, according to the embodiment, because the wire-based structure is used, the steering motor 23 can be located at a position further separated from the steering roller 63 in comparison with the cam-based structure not using any wire. Therefore, the layout of components near the steering roller 63 can be designed more freely. In particular, because the one-side held wire structure is used in the structure according to the embodiment, a space required for wire routing can be reduced and the wire can be laid more easily, in comparison with the structure using a loop-shaped wire, such as the one disclosed in Japanese Patent Application Laid-open No. H9-48533.

However, because the wire 80 is kept tensioned with a certain tensile force of a certain level or higher, the wire 80 becomes stretched, in no smaller part, after a long time of usage. Furthermore, the wire 80 could also become stretched if an external force of an unexpected strength is applied thereto. If the wire 80 is stretched, the position of the driving end of the steering roller 63 becomes different between before and after the wire 80 is stretched. In such a case, the steering roller 63 is inclined by different amounts between before and after the wire 80 is stretched, even if the rotation angle of the steering motor 23 is kept the same. Therefore, the inclining control that has been performed appropriately before the wire 80 is stretched can no longer be performed appropriately after the wire 80 is stretched.

In response to this issue, in this embodiment, the rotation angle of the steering motor 23 when the steering roller 63 is at a predetermined reference inclination is used as a reference rotation angle (operation reference), and the rotation angle of the steering motor 23 is controlled based on the reference rotation angle. In other words, to bring the inclination amount of the steering roller 63 to the target inclination amount, the rotation angle of the steering motor 23 is controlled using a relative value with respect to the reference rotation angle. In this embodiment, the reference rotation angle is updated every time predetermined adjustment timing arrives, to reset a control error resulting from the wire 80 being stretched, and to enable the inclining control to be performed properly. A specific example will now be explained.

Figure 9:
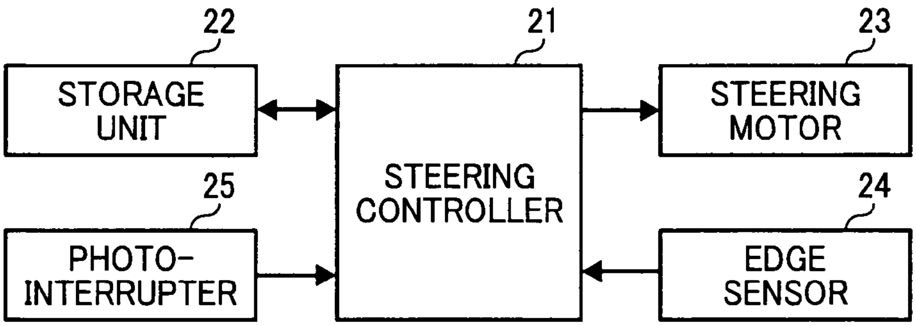
FIG. 9 is a block diagram of a control-related portion of the belt driving device.

FIG. 9 is a block diagram of a control-related portion of the belt driving device.

The steering controller 21 controls driving conditions of the steering motor 23, and outputs a motor controlling signal (motor driving signal) to the steering motor 23 to control such driving conditions. A motor being capable of controlling the rotation angle or the rotation speed of the steering motor 23 highly precisely is used as the steering motor 23, e.g., a stepper motor or a linear motor. In this embodiment, a stepper motor is used as the steering motor 23. The steering controller 21 is connected to the edge sensor 24, and receives belt position information (a belt edge signal) from the edge sensor 24. The steering controller 21 is connected to a photointerrupter 25 that is a position detecting unit to be described later, and receives reference inclined position information from the photointerrupter 25. The steering controller 21 is also connected to a storage unit 22. The storage unit 22 stores therein the amount by which the steering motor is operated (rotation angle) when the reference inclined position information is received from the photointerrupter 25, as the reference rotation angle (operation reference).

As to whether the steering roller 63 is at the reference inclined position, it is determined by detecting the position of a displacing member that is integrally displaced with the steering roller correspondingly to the inclination amount by which the steering roller 63 is inclined. More specifically, in this embodiment, a filler 91 is fixed to the roller holder 81 that is integrally rotated with an inclining movement of the steering roller 63, and is used as the displacing member. A light emitter and a light receiver of the photointerrupter 25, which is the position detecting unit, are arranged facing each other across the path of the movement of the filler 91. The photointerrupter 25 is arranged at a position where the filler 91 is at when the steering roller 63 is positioned at the reference inclined position. In this manner, the filler 91 blocks the light path of the photointerrupter 25 when the steering roller 63 is at the reference inclined position, to bring the output level of the light receiver to a predetermined value or lower. When the output level of the photointerrupter 25 becomes lower than a predetermined value, the steering controller 21 receives the reference inclined position information. In this manner, the steering controller 21 can recognize whether the steering roller 63 is actually positioned at the reference inclined position from the reference inclined position information.

The steering controller 21 stores the amount by which the steering motor operation is operated (rotation angle) when the reference inclined position information is received from the photointerrupter 25 in the storage unit 22 as the reference rotation angle (operation reference). The reference rotation angle stored in the storage unit 22 is updated every time predetermined adjustment timing arrives. In this embodiment, because the timing of the printer power-on is used as the adjustment timing, the reference rotation angle is updated every time the printer is powered on. Therefore, even if the wire 80 that is a structural member of the inclining mechanism becomes stretched due to some factors, the control error attributable to such a stretch is reset every time the power is turned on.

Figure 10:
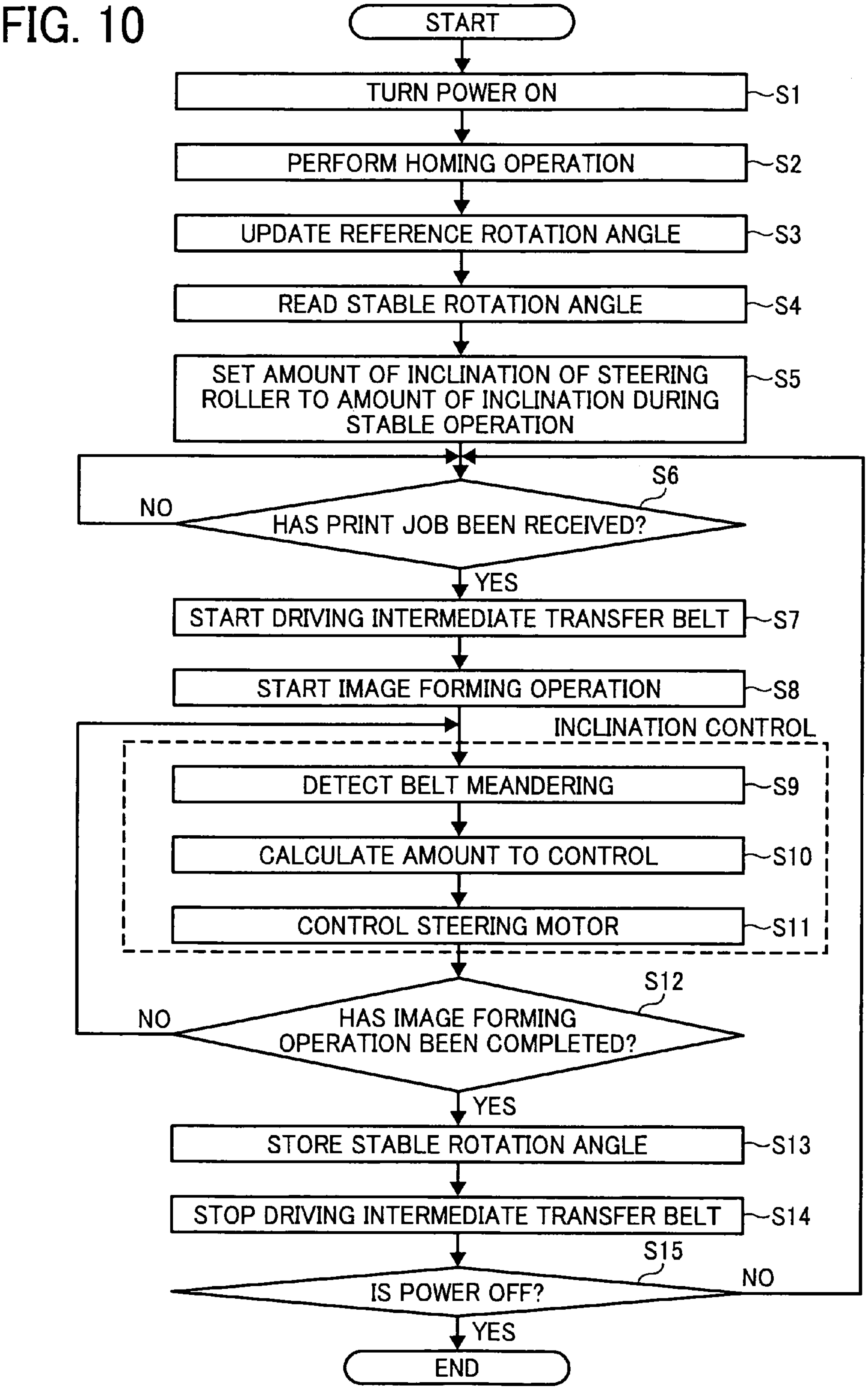
FIG. 10 is a flowchart of a series of controls for reducing meandering of the intermediate transfer belt.

FIG. 10 is a flowchart of a series of controls for suppressing meandering.

When the printer is powered on (S1), the steering controller 21 performs a homing operation in which the steering motor 23 is driven to rotate at a predetermined speed to bring the filler 91 fixed to the roller holder 81 closer to a position where the light path of the photointerrupter 25 is blocked thereby, before starting running the intermediate transfer belt 61 (S2). When the filler 91 blocks the light path of the photointerrupter 25 and the steering controller 21 receives the reference inclined position information from the photointerrupter 25, the steering controller 21 stores the rotation angle of the steering motor 23 at this condition in the storage unit 22 as the reference rotation angle. In this manner, reference rotation angle data stored in the storage unit 22 is updated (S3).

The steering controller 21 then read data of a stable rotation angle stored in the storage unit 22 (S4), controls the rotation angle of the steering motor 23 by using the stable rotation angle and the reference rotation angle stored in the storage unit 22, and sets the inclination amount of the steering roller 63 to the inclination amount during a stable operation in which the meandering is suppressed (S5).

More specifically, the data of the stable rotation angle stored in the storage unit 22 is the data of the rotation angle of the steering motor 23 that is set immediately before this time. In this embodiment, because the rotation angle of the steering motor 23 controlled by the steering controller 21 is a relative value with respect to the reference rotation angle, the data of the stable rotation angle stored in the storage unit 22 represents a relative rotation angle of the steering motor 23 with respect to the reference rotation angle before being updated (that is, the reference rotation angle that was updated when the power was turned on previously). Assuming that the wire 80 becomes stretched after the power was turned on previously, if the rotation angle of the steering motor 23 is set to a rotation angle determined based on the data of the reference rotation angle before being updated and the data of the stable rotation angle, the actual inclination amount of the steering roller 63 slightly deviates from the target inclination amount by the amount the wire 80 has become stretched. Such a deviation accumulates into a large control error, and the meandering of the intermediate transfer belt 61 can be hardly controlled in a stable manner. On the contrary, if the rotation angle of the steering motor 23 is set to a rotation angle (absolute rotation angle) that is determined based on the reference rotation angle updated when the power is turned on this time and the stable rotation angle, the deviation caused by the stretched wire 80 is reset by updating the reference rotation angle, and the actual inclination amount of the steering roller 63 is matched with the target inclination amount. This is because, even if the wire 80 is stretched, the amount by which the steering roller 63 is inclined by the rotation angle of a single step of the steering motor 23 remains the same. Therefore, by controlling the rotation angle of the steering motor 23 using the data of the stable rotation angle stored in the storage unit 22 and the data of the updated reference rotation angle stored in the storage unit 22, the inclination amount of the steering roller 63 can be set to the inclination amount during the stable operation where the meandering is suppressed.

The printer then is kept idle, waiting for a print job to be received (S6). Once a print job is received, the printer starts driving the intermediate transfer belt 61 (S7), and performs an image forming operation according to the print job (S8). During the image forming operation, the edge sensor 24 detects the displacement of the intermediate transfer belt 61 along the width direction (meandering) (S9), and the steering controller 21 calculates the amount by which the steering motor 23 should be controlled (the target rotation angle) required to suppress the meandering based on the detection result (S10), and controls the rotation angle of the steering motor 23 so that the rotation angle of the steering motor 23 is brought to the target rotation angle (S11) based on the calculation result. The inclining controls at S9 to S11 are repeated until the image forming operation is completed (S12).

To describe the inclining control according to the embodiment more specifically, when the output shaft of the steering motor 23 is rotated in the counterclockwise direction in FIG. 2 while the steering roller 63 is horizontal, the wire 80 is wound by the winding pulley 87, and the roller holder 81 is rotated in the θ1 direction. In this manner, the driving end of the steering roller 63 is lifted by the roller holder 81, and the steering roller 63 is inclined accordingly to the amount by which the driving end of the steering roller 63 is lifted. At this time, the position of the intermediate transfer belt 61 wound around the steering roller 63 becomes displaced toward a side opposing to the driving end of the steering roller 63 along the belt-width direction. On the contrary, when the output shaft of the steering motor 23 is rotated in the clockwise direction in FIG. 2 while the steering roller 63 is horizontal, the wire 80 is released from the winding pulley 87, and the roller holder 81 is rotated in the θ2 direction. In this manner, the driving end of the steering roller 63 is pressed down by the roller holder 81, and the steering roller 63 is inclined accordingly to the amount by which the driving end of the steering roller 63 is pressed down. At this time, the position of the intermediate transfer belt 61 wound around the steering roller 63 is displaced toward the driving end of the steering roller 63 along the belt-width direction. Therefore, by using the edge sensor 24 to detect the displacement (position change) of the intermediate transfer belt 61 in the belt-width direction and by driving the steering motor 23 based on the detection result to control the inclination of the steering roller 63 as appropriate, the meandering of the intermediate transfer belt 61 can be corrected.

When the image forming operation is completed, the steering controller 21 stores the rotation angle of the steering motor 23 (the relative rotation angle) at this condition in the storage unit 22 as the stable rotation angle (S13), and stops driving the intermediate transfer belt 61 (S14). The printer is then kept idle waiting for a print job to be received (S6), until the power is turned off (S15).

First Modification

A belt driving device according to a modification of the embodiment (hereinafter, "first modification") will now be explained.

Figure 11:
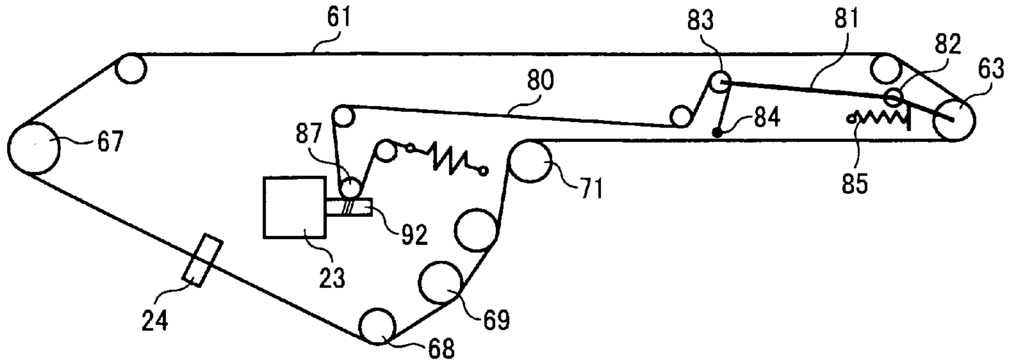
FIG. 11 is a schematic for explaining a general structure of a belt driving device according to a first modification of the embodiment.

FIG. 11 is a schematic for explaining a general structure of the belt driving device according to the first modification.

In the structure according to the embodiment explained above, the roller holder 81 is kept biased in the θ2 direction by the pulling spring 85. Therefore, to keep the inclined position of the steering roller 63, a current must be kept supplied to the steering motor 23 so that a driving force is kept generated against the biasing force. Therefore, in the first modification, a structure being capable of maintaining the inclined position of the steering roller 63 without using the driving force from the steering motor 23 is adopted.

More specifically, as illustrated in FIG. 11, a worm 92 is arranged on the output shaft of the steering motor 23 instead of the driving pulley 86, and a worm wheel is arranged in the winding pulley 87 instead of the belt pulley portion 87*a*, to form a worm drive on the communication path of the driving force from the steering motor 23. In such an arrangement, when a driving rotation of the steering motor 23 is applied to the worm 92, the worm wheel in the winding pulley 87 is rotated, but the worm 92 is not rotated when the rotational driving force is applied to the worm wheel in the winding pulley 87. Therefore, the roller holder 81 is kept biased in the θ2 direction by the pulling spring 85, and even if the tensile force is applied to the wire 80 in the direction to release the wire 80, the wire 80 is prevented from being released by the worm drive. Therefore, according to the first modification, a current only needs to be applied to the steering motor 23 upon driving the steering motor 23 in rotation to change the inclined position of the steering roller 63, and the current does not need to be supplied to the steering motor 23 while maintaining the inclined position of the steering roller 63.

In the explanation of the first modification, the worm drive is used. However, the same effect can be achieved by using a torque diode, such as ones supplied by NTN Corporation.

Second Modification

A belt driving device according to another modification of the embodiment (hereinafter, "second modification") will now be explained.

Figure 12:
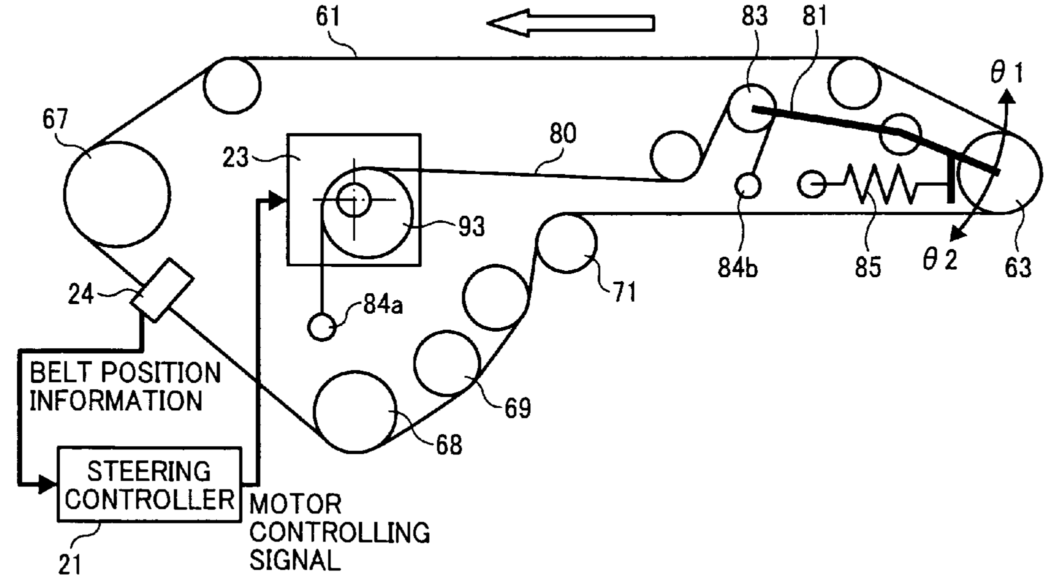
FIG. 12 is a schematic for explaining a general structure of a belt driving device according to a second modification of the embodiment.

FIG. 12 is a schematic for explaining a general structure of the belt driving device according to the second modification.

In the embodiment explained above, a winding structure, in which one end of the wire 80 is wound around or released from the winding pulley 87, is adopted as the structure for pulling or sending out the wire 80. On the contrary, in the second modification, a structure in which an eccentric cam 93 is used as a wire displacing unit for displacing a part of the wire 80 in a direction inclined with respect to the direction of the tensile force of the wire 80 (in the direction substantially perpendicular to the direction of the tensile force of the wire in the second modification) is adopted as a structure for pulling or sending out the wire 80.

More specifically, as illustrated in FIG. 12, both ends of the wire 80 are fixed to two wire holders 84*a* and 84*b*, respectively. An eccentric cam 93 is arranged, instead of the driving pulley 86, on the output shaft of the steering motor 23, and the wire 80 is tensioned across the cam surface of the eccentric cam 93. In this structure, depending on an angle by which the eccentric cam 93 is rotated, the wire portion wound around the cam surface of the eccentric cam 93 is displaced in the direction substantially perpendicular to the direction of the tensile force of the wire by a different amount. When the portion of wire 80 is displaced, the moving pulley 83 is displaced accordingly, to move the roller holder 81 in rotation, causing the steering roller 63 to incline. Therefore, in the second modification as well, by controlling the rotation angle of the steering motor 23, the inclination amount of the steering roller 63 can be controlled. Furthermore, in the second modification as well, even if the wire 80 becomes stretched due to some factors, the control error attributable to such a stretch is reset every time the power is turned on.

In the structure according to the second modification, the range by which the steering roller 63 is inclined, that is, the controllable range of the inclination is limited to a range corresponding to a range in which the wire 80 is allowed to be pulled or sent out while the eccentric cam 93 travels halfway around. From the perspective of an increased range of the controllable inclination amount of the steering roller 63, the winding structure described above is more effective.

Furthermore, in the second modification, when the relationship between the rotation angle of the eccentric cam 93 and the amount by which the steering roller 63 is inclined is non-linear, the relationship between the rotation angle of the eccentric cam 93 and the amount by which the steering roller 63 is inclined must be recognized in advance. Therefore, data representing the relationship between the rotation angle of the eccentric cam 93 and the amount by which the steering roller 63 is inclined is stored in the storage unit 22 in advance, when applicable.

Third Modification

A the belt driving device according to still another modification of the embodiment (hereinafter, "third modification") will now be explained.

Figure 13:
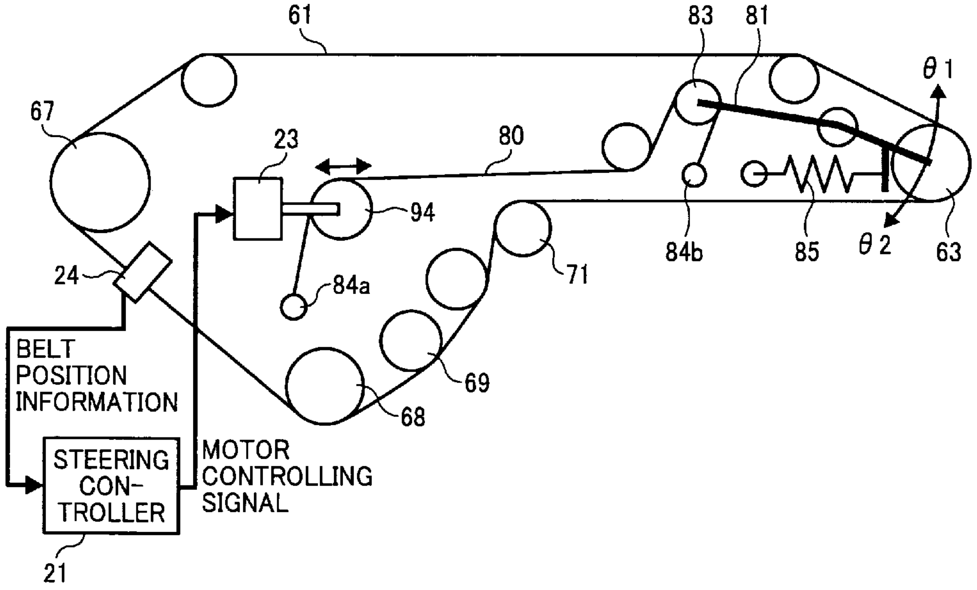
FIG. 13 is a schematic for explaining a general structure of a belt driving device according to a third modification of the embodiment.

FIG. 13 is a schematic for explaining a general structure of the belt driving device according to the third modification.

The belt driving device according to the third modification also adopts an arrangement for pulling or sending out the wire 80 by displacing a part of the wire 80 in a direction inclined with respect to the direction of the tensile force of the wire 80 (in the direction substantially perpendicular to the direction of the tensile force of the wire 80 according to the third modification), in the same manner as in the second embodiment, except the wire displacing unit has a different structure.

Specifically, a movable pulley 94 attached to a directly operating shaft (e.g., a ball screw) of the steering motor 23 is used as a wire displacing unit, in place of the eccentric cam 93, as illustrated in FIG. 13. The shaft of the steering motor 23 directly operates according to its rotation amount. The wire 80 is tensioned across the movable pulley 94. The displacement amount of the movable pulley 94 changes according to the rotation amount of the steering motor 23, whereby the displacement amount of the wire portion wound around the movable pulley 94 in the direction substantially perpendicular to the direction of the tensile force of the wire is changed. When the wire portion is displaced, the moving pulley 83 is displaced accordingly, which rotates the roller holder 81 and causes the steering roller 63 to incline. Therefore, in the third modification as well, the inclination amount of the steering roller 63 can be controlled by controlling the rotation angle of the steering motor 23. Furthermore, in the third modification as well, even if the wire 80 becomes stretched for some reasons, a control error attributable to such a stretch is reset every time the power is turned on.

In the third modification, as illustrated in FIG. 13, the movable pulley 94 is displaced in substantially the same direction as the direction of the tensile force of the wire portion between the movable pulley 94 and the moving pulley 83. If these directions are significantly different, an angular relationship between the direction in which the movable pulley 94 is displaced and the direction of the tensile force of the wire portion changes as the movable pulley 94 is displaced. When such an angular relationship changes, the relationship between the amount by which the movable pulley 94 is displaced and the amount by which the wire is pulled or sent out also changes. In such a configuration, the amount by which the steering roller 63 is inclined by the rotation angle of a single step of the steering motor 23 changes depending on the amount by which the movable pulley 94 is displaced. Therefore, the inclining control becomes more complex. On the contrary, in the structure according to the third modification, because the movable pulley 94 is displaced in substantially the same direction as the direction of the tensile force of the wire portion, the angular relationship between these directions is maintained even when the movable pulley 94 is displaced. Therefore, a change in the amount by which the steering roller 63 is inclined by the rotation angle of a single step of the steering motor 23 when the movable pulley 94 is displaced can be reduced to an ignorable level, and the inclining control can be prevented from becoming complex.

As explained above, in the printer according to the embodiment (including the modifications thereof), an image formed on the outer circumferential surface of the intermediate transfer belt 61 that is an endless belt tensioned across and supported by the supporting rollers 63, 67, 68, 69, and 71, and like is transferred onto the recording sheet P that is a recording medium to form an image on the recording sheet P. As a belt driving unit for running the intermediate transfer belt 61, the printer uses the belt driving device including the intermediate transfer belt 61 that is tensioned across and supported by the supporting rollers 63, 67, 68, 69, and 71, and the like including the steering roller 63 for correcting the belt meandering, the inclining mechanism that performs an operation of inclining the steering roller 63 using the driving force from the steering motor 23 that is a driving source, the edge sensor 24 that is a belt-width direction displacement detecting unit that detects the displacement of the intermediate transfer belt 61 in the belt-width direction, and the steering controller 21 that is an inclination controlling unit that determines the amount by which the steering roller 63 is inclined based on the detection result of the edge sensor 24, and controls the operation of the inclining mechanism (the rotation of the steering motor 23) so that the steering roller 63 is inclined by the amount thus determined, to correct the meandering of the intermediate transfer belt 61 by changing the amount by which the steering roller 63 is inclined. The belt driving device further includes the filler 91 that is a displacing member that is displaced integrally with the steering roller 63 correspondingly to the inclination amount of the steering roller 63, the photointerrupter 25 that is a position detecting unit that detects the position of the filler 91 when the steering roller 63 is in a predetermined reference inclined position, and the storage unit 22 that is a storage unit storing therein a reference rotation angle of the steering motor 23 as an operation reference for the inclining mechanism. Every time predetermined adjustment timing (timing of power-on) arrives, the steering controller 21 drives the steering motor 23 in rotation to bring the steering roller 63 to the reference inclined position based on the detection result of the photointerrupter 25, functions as an operation reference saving unit that stores the rotation angle of the steering motor 23 in this condition in the storage unit 22 as the reference rotation angle, and controls the rotation of the steering motor 23 based on the reference rotation angle stored in the storage unit 22. In this manner, even when the wire 80 that is a structural member of the inclining mechanism becomes stretched due to some factors to cause a control error such as that the actual amounts of inclination of the steering roller 63 become different before and after the wire 80 is stretched despite the rotation angle of the steering motor 23 is controlled to incline the steering roller 63 by the same amount, the control error is reset every time the power is turned on (every time the predetermined adjustment timing arrives). Therefore, according to the embodiment (including the modifications thereof), even if the wire 80 becomes stretched to cause a control error, the control error can be reset as appropriate, and the inclination of the steering roller 63 can be kept controlled properly.

Furthermore, the belt driving device according to the first modification includes a position maintaining unit that maintains the inclined position of the steering roller 63 without using the driving force from the steering motor 23. More specifically, as the position maintaining unit, the worm drive, having an output shaft configured to be rotated when a rotational driving force is applied to an input shaft connected to the steering motor 23, and having the input shaft configured not to be rotate when the rotational driving force is applied to the output shaft, is arranged on the communication path of the driving force from the steering motor 23. In this manner, the current only needs to be supplied to the steering motor 23 upon driving the steering motor 23 in rotation to change the inclined position of the steering roller 63, without supplying the current to the steering motor 23 while the inclined position of the steering roller 63 is maintained. In this manner, the power consumption can be reduced.

Furthermore, the belt driving device according to the embodiment (including the modifications thereof) includes the wire 80, the pulling spring 85 that is a tensile force applying unit that applies a tensile force to the wire 80, and a wire driving member (e.g., the winding pulley 87 and on the like, the worm drive, the eccentric cam 93, or the movable pulley 94) that moves the wire 80 by an amount corresponding to the amount by which the steering motor 23 is driven, and the steering roller 63 configured to be inclined corresponding to the amount by which the wire 80 is moved. The steering controller 21 is configured to control the operation of the inclining mechanism by controlling the rotation angle of the steering motor 23 (the amount by which the steering motor 23 is driven). By employing such a wire-based structure, the steering motor 23 can be arranged at a position separated from the steering roller 63, in comparison with a cam-based structure not using any wire. Therefore, the layout of components near the steering roller 63 can be designed more freely.

In particular, according to the embodiment (including the modifications thereof), one end of the wire 80 is connected to the steering roller 63, and the other end of the wire 80 is connected to the wire driving member. By adopting such a structure, a space required for wire routing can be reduced and the wire can be laid more easily, in comparison with the structure using a loop-shaped wire, such as the one disclosed in Japanese Patent Application Laid-open No. H9-48533.

Furthermore, according to the embodiment and the first modification, the wire driving member includes the winding pulley 87 that is a wire winding portion around which the part near the other end (the driving end) of the wire 80 is wound, and such a part near driving end of the wire 80 is wound around the winding pulley 87 by an amount corresponding to the amount by which the steering motor 23 is driven. Therefore, the range by which the steering roller 63 is inclined, that is, the controllable range of inclination can be increased.

Alternatively, as disclosed in the second modification and the third modification, the same inclining control can be achieved by a structure in which the wire driving member includes the eccentric cam 93 or the movable pulley 94 that is the wire displacing unit for displacing part of the wire 80 in the direction inclining with respect to the direction of the tensile force of the wire, and causes the eccentric cam 93 or the movable pulley 94 to be displaced by an amount corresponding to an amount by which the steering motor 23 is driven.

Furthermore, according to the embodiment (including the modifications thereof), the stopper 95 for restricting the rotation of the roller holder 81 is arranged as a restricting unit that restricts the range by which the inclining mechanism is allowed to move to a predetermined range. With such a structure, the roller holder 81, for example, included in the inclining mechanism can be prevented from interfering with the components located nearby.

Furthermore, according to the embodiment (including the modifications thereof), the structural members included in the inclining mechanism are arranged in a space surrounded by the inner circumferential surface of the intermediate transfer belt 61. Because the space surrounded by the inner circumferential surface of the intermediate transfer belt 61 tends to be a dead space, by taking advantage of such a space, a space saving can be achieved, and the size of the apparatus can be prevented from becoming large.

Furthermore, according to the embodiment (including the modifications thereof), the belt driving device has a unit structure supporting at least the supporting rollers 63, 67, 68, 69, and 71 by and across which the intermediate transfer belt 61 is supported and tensioned, the intermediate transfer belt 61, and the transfer unit 60 supporting the inclining mechanism and the filler 91, and is configured to be integrally mountable to or removable from the printer main body.

In the explanation of the embodiment (including the modifications thereof), the intermediate transfer belt 61 is used as an example of the endless belt. However, the present invention may also be applied to an image forming apparatus using an endless photosensitive belt, a sheet conveying belt, and the like, and may also be applied as a belt driving device for an apparatus other than an image forming apparatus (e.g., belt conveyor).

According to the present invention, the amount by which the inclining mechanism is operated when the inclined position of the steering roller is at the reference inclined position is used as an operation reference, and the operation of the inclining mechanism is controlled based on the operation reference. The belt driving device checks whether the inclined position of the steering roller is at the reference inclined position by detecting the position of the displacing member that is integrally displaced with the steering roller correspondingly to the inclination amount of the steering roller. Therefore, the operation reference, used as a reference for controlling the operation of the inclining mechanism, corresponds to the amount by which the inclining mechanism is operated when the inclined position of the steering roller is actually at the reference inclined position. The operation reference is updated every time a predetermined adjustment timing arrives. Therefore, even if a structural member of the inclining mechanism changes in the condition due to some factors and a control error, such as a difference in the actual inclination amount of the steering roller between before and after the condition change, the control error is reset every time the predetermined adjustment timing arrives. In other words, because such a control error appears as a shift in the operation reference that is the amount by which the inclining mechanism is operated when the inclined position of the steering roller is at the reference inclined position, the control error is reset by updating the operation reference. Therefore, even when the structural member of the inclining mechanism changes due to some factors and causes a control error, the control error is reset as appropriate, and the inclination of the steering roller can be kept properly controlled.

As described above, according to the present invention, even if the structural member of the inclining mechanism changes, the inclining control for the steering roller can be performed properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt driving device comprising:

an endless belt that is stretched over and supported by a plurality of supporting rollers including a steering roller for correcting belt meandering;

an inclining mechanism that performs an operation of inclining the steering roller by a driving force from a driving source;

a belt-width direction displacement detecting unit that detects displacement of the endless belt in a belt-width direction;

an inclination controlling unit that determines an inclination amount of the steering roller based on a detection result obtained by the belt-width direction displacement detecting unit, and controls the operation of the inclining mechanism to incline the steering roller by the inclination amount such that meandering of the endless belt is corrected by changing the inclination amount of the steering roller;

a displacing member that is displaced integrally with the steering roller according to the inclination amount of the steering roller; and a position detecting unit that detects a position of the displacing member when the steering roller is in a predetermined reference inclined position, wherein the inclination controlling unit causes the inclining mechanism to perform the operation of inclining the steering roller to the reference inclined position based on a detection result obtained by the position detecting unit every time predetermined adjustment timing arrives and, using an amount of the operation performed by the inclining mechanism as an operation reference, controls the operation of the inclining mechanism based on the operation reference.

2. The belt driving device according to claim 1, further comprising a storage unit that stores therein the operation reference for the inclining mechanism, wherein the inclination controlling unit stores the amount of the operation performed by the inclining mechanism when the inclining mechanism performs the operation of inclining the steering roller to the reference inclined position at the predetermined adjustment timing in the storage unit as the operation reference, and controls the operation of the inclining mechanism based on the operation reference stored in the storage unit.

3. The belt driving device according to claim 1, further comprising a position maintaining unit that maintains an inclined position of the steering roller without using the driving force from the driving source.

4. The belt driving device according to claim 3, wherein the position maintaining unit includes a worm drive or a torque diode located on a communication path of the driving force from the driving source and provided with an output shaft and an input shaft, the output shaft configured to be rotated when a rotational driving force is applied to the input shaft connected to the driving source, and the input shaft configured not to be rotated when a rotational driving force is applied to the output shaft.

5. The belt driving device according to claim 1, wherein the inclining mechanism includes a wire, a tensile force applying unit that applies a tensile force to the wire, and a wire driving member that moves the wire by an amount corresponding to a driving amount of the driving source, the steering roller is configured to be inclined according to a movement of the wire, and the inclination controlling unit controls the operation of the inclining mechanism by controlling the driving amount of the driving source.

6. The belt driving device according to claim 5, wherein the driving source is a stepper motor.

7. The belt driving device according to claim 5, wherein the driving source is a linear motor.

8. The belt driving device according to claim 5, wherein the inclining mechanism has a structure in which a first end of the wire is connected to the steering roller, and a second end of the wire is connected to the wire driving member.

9. The belt driving device according to claim 8, wherein the wire driving member includes a wire winding portion around which the second end of the wire is wound, the wire driving member configured to wind the second end of the wire around the wire winding portion by an amount by which the wire is moved correspondingly to the driving amount of the driving source.

10. The belt driving device according to claim 5, wherein the wire driving member includes a wire displacing unit that causes a portion of the wire to be displaced in a direction inclining with respect to a direction of the tensile force of the wire, and the wire displacing unit is configured to be displaced by an amount by which the wire is moved correspondingly to the driving amount of the driving source.

11. The belt driving device according to claim 1, further comprising a restricting unit that restricts a range of the operation of the inclining mechanism to a certain range.

12. The belt driving device according to claim 1, wherein the inclining mechanism is located in a space surrounded by an inner circumferential surface of the endless belt.

13. The belt driving device according to claim 1, having a unit structure that supports at least the supporting rollers, the endless belt, the inclining mechanism, and the displacing member, and is configured to be integrally attachable to and removable from an apparatus main body.

14. An image forming apparatus that forms an image on a recording medium by transferring an image formed on a circumferential surface of an endless belt stretched over and supported by a plurality of supporting rollers onto the recording medium or forms an image on a recording medium carried on the circumferential surface of the endless belt, the image forming apparatus comprising a belt driving device as a belt driving unit that drives the endless belt, the belt driving device including:

the endless belt that is stretched over and supported by the supporting rollers including a steering roller for correcting belt meandering;

an inclining mechanism that performs an operation of inclining the steering roller by a driving force from a driving source;

a belt-width direction displacement detecting unit that detects displacement of the endless belt in a belt-width direction;

an inclination controlling unit that determines an inclination amount of the steering roller based on a detection result obtained by the belt-width direction displacement detecting unit, and controls the operation of the inclining mechanism to incline the steering roller by the inclination amount such that meandering of the endless belt is corrected by changing the inclination amount of the steering roller;

a displacing member that is displaced integrally with the steering roller according to the inclination amount of the steering roller; and a position detecting unit that detects a position of the displacing member when the steering roller is in a predetermined reference inclined position, wherein the inclination controlling unit causes the inclining mechanism to perform the operation of inclining the steering roller to the reference inclined position based on a detection result obtained by the position detecting unit every time predetermined adjustment timing arrives and, using an amount of the operation performed by the inclining mechanism as an operation reference, controls the operation of the inclining mechanism based on the operation reference.

* * * * *